3,068,073
DETERMINATION OF CARBON DIOXIDE
Evelyn C. Stanford, Wilkinsburg, Pa., assignor to Mine Safety Appliances Company, Pittsburgh, Pa., a corporation of Pennsylvania
No Drawing. Filed Apr. 22, 1960, Ser. No. 23,908
6 Claims. (Cl. 23—232)

This invention relates to the detection and quantitative determination of carbon dioxide in other gases.

The carbon dioxide content in air and other gases has been determined by methods based on the color change occurring in acid and basic indicator solutions. These methods are cumbersome and time consuming, and the solution methods are not satisfactory for field and plant use by unskilled personnel in that solutions are inconvenient to handle and liable to spillage, the fragile equipment used is subject to breakage, and the methods involve back titrating or other procedures requiring special skills.

Convenient, simple, and rapid methods have been used to determine some gases other than carbon dioxide in which the gas is passed through a dry solid reagent consisting of a granular solid impregnated with a color changing indicator. However, heretofore no dry solid reagent has been found satisfactory for the detection and determination of low concentrations of carbon dioxide. Granular solids impregnated with acid base indicators have not been believed satisfactory because no color change occurs, or the color change is indistinct, or there is deleterious interaction between the carrier and the indicator.

It is an object of this invention to provide a simple, rapid, and reliable method of detecting and quantitatively determining carbon dioxide in gases, particularly in air, that is satisfactory for field and plant use, and that may be practiced by unskilled persons.

Another object is to provide a solid reagent that changes color on contact with carbon dioxide suitable for use in the foregoing object.

Other objects will be apparent from the following description and claims.

This invention is predicated on my discovery that a distinct color change from blue or blue-purple to pink or yellow occurs when air or other gas that contains carbon dioxide is passed through a bed of activated alumina carrying thymol blue or thymol blue and a base. When air or other gas to be tested is passed through such a solid reagent disposed in a transparent tube of glass or other inert material, the presence of carbon dioxide causes the development of the pink or yellow color along the length of the reagent bed in the direction in which the air is passed, thus affording indication of the presence of carbon dioxide. The length over which the coloration occurs is dependent, when tested under standard conditions, upon the concentration of carbon dioxide in the atmosphere tested.

The solid reagent of this invention is simply prepared by mixing together activated alumina and a solution of thymol blue or thymol blue and base, preferably using an alcohol, water, or mixtures thereof as a solvent. The impregnated alumina is then dried to remove substantially all the solvent, preferably under vacuum at room or moderately elevated temperatures. In the course of drying, the impregnated alumina changes color from blue to blue-purple to yellow, and then from yellow to blue or blue-purple; the reagent is sufficiently dried when the second color change occurs, although further drying has no adverse effect.

The following examples are illustrative of this invention.

*Example 1.*—From 0.005 g. to 0.04 g., preferably about 0.02 g., thymol blue in sufficient ethanol to make a 0.1 weight percent solution is mixed with 100 cc. of activated alumina, and the mixture is vacuum dried at 70–75° C. This resultant dry solid reagent changes color from blue-purple to pink when contacted with air or gas containing $CO_2$, and as indicated above, is suitable for detecting and quantitatively determining carbon dioxide.

*Example 2.*—From about 5 to 40 ml. of 0.1% ethanol solution of thymol blue (0.005 g. to 0.04 g. of thymol blue) and from 2.5 to 10 ml. of 4% aqueous NaOH (0.1 g. to 0.4 g. of NaOH) are mixed with 100 cc. of activated alumina and vacuum dried. The resultant reagent changes color from blue-purple to pink when contacted with air or gas containing carbon dioxide, and is suitable for use in detecting and determining carbon dioxide. Generally, any base may be used, although it is preferred to use inorganic bases or organic bases of low volatility, e.g., alkali metal hydroxides, alkali metal carbonates and bicarbonates, and alkaline earth metal hydroxides.

*Example 3.*—It is especially preferred to use diethanolamine as the base since the resulting reagent changes color from blue to yellow. This color change is more easily seen and less subject to subjective misreading than the blue-purple to pink color change. Illustrative of this preferred reagent, from 5 to 40 ml., preferably 20 ml. of 0.1% thymol blue in ethanol; 1.1 g. to 11 g., preferably 5.5 g., of diethanolamine; and 40 ml. of deionized water are mixed with 100 cc. of activated alumina and vacuum dried in the same manner as in the previous examples.

In the practice of the invention the gas to be tested is passed through a bed of the reagent. Although this may be done in many ways, it is preferred, especially for field use, to apply it in the general manner described in Patent No. 2,174,349 to John B. Littlefield, i.e., an elongate bed of the solid reagent is disposed in a small cross-sectional tube of glass or other inert transparent material, held in place by end plugs of, for example, glass wool or glass tape, and the ends of the tube are sealed. When a determination is to be made the sealed ends are opened and the air or other gas to be tested is flowed through the tube by any suitable means, as by an aspirator bulb. The presence of carbon dioxide in the atmosphere converts the blue-purple or blue reagent to a pink or yellow color promptly. To quantitatively determine carbon dioxide, a measured volume of gas, supplied in any was as by means of an aspirator bulb with known volumetric delivery, is passed through a tube as just described, and the length over which the pink or yellow color is developed affords a measure of the concentration of carbon dioxide. By comparing the length of coloration with a scale calibrated by the use of the standard volume of different known concentrations of carbon dioxide in air there is thus a direct determination.

To indicate the sensitivity of this reagent it is possible using tubes prepared as described above to determine quantitatively from less than 0.1% to 1% of carbon dioxide in air using a 50 cc./min. sample or 3 minutes with a tube of 3.0 mm. I.D. having a 52 mm. length of solid reagent. Thus, for example, a sample of air containing 0.2% carbon dioxide tested as above gave a length of color change of 23 mm. with activated alumina carrying thymol blue; of 17 mm. with activated alumina carrying thymol blue and 0.2 g. of sodium hydroxide per 100 cc. of alumina. Higher concentrations of carbon dioxide concentration can readily be determined by increasing the diameter of the reagent bed, decreasing the volume of the sample, or most conveniently by increasing the amount of base carried by the reagent. Thus, for example, a sample of air containing 0.5% carbon dioxide tested as above gave a length of color change of 9 mm. with activated alumina carrying thymol blue and 11 g. of diethanolamine per 100 cc. of activated alumina, and of 22 mm. when carrying 2.75 g. per 100 cc. of activated alumina. The color development is independent of humidity and substantially independent of temperature; the length over which the color develops increases only very slightly with increasing temperature.

The activated alumina should be neither too fine nor too coarse so that the tube will contain an adequately packed bed of the reagent without creating too great resistance to flow. I have found that activated alumina between 16 and 200 mesh size gives satisfactory results, and it is preferred to use activated alumina passing 80 and retained on 200 mesh.

According to the provisions of the patent statutes, I have explained the principle and mode of practicing my invention and have described what I do consider its best embodiment. However, I desire it to be understood that, within the scope of the appended claims, the invention may be practiced otherwise than as specifically described.

I claim:

1. A method of determining carbon dioxide in a gas which comprises the steps of passing the gas to be tested through a solid reagent comprising activated alumina carrying a material selected from the group consisting of thymol blue and thymol blue together with a base, said reagent being confined within a transparent container and said reagent being changed in color by contact with carbon dioxide.

2. A method according to claim 1 comprising passing a predetermined volume of gas to be tested through an elongate bed of said solid reagent, the change of color occurring over a length that is dependent upon the concentration of said carbon dioxide, and measuring the length over which the color change occurs.

3. A method according to claim 1, said solid reagent being activated alumina carrying thymol blue and diethanolamine.

4. A solid reagent for determining carbon dioxide comprising activated alumina carrying a material selected from the group consisting of thymol blue and thymol blue together with a base.

5. A solid reagent according to claim 4 in which the base is diethanolamine.

6. A solid reagent according to claim 5 in which the activated alumina carries per 100 cc. from about 0.005 to 0.04 g. of thymol blue and from about 1 to 11 g. of diethanolamine.

References Cited in the file of this patent

UNITED STATES PATENTS

| | | |
|---|---|---|
| 2,174,349 | Littlefield | Sept. 26, 1939 |
| 2,270,025 | Ruhoff | Jan. 13, 1942 |
| 2,818,323 | Haensel | Dec. 31, 1957 |
| 2,880,072 | Grosskopf | Mar. 31, 1959 |

OTHER REFERENCES

Kolthoff et al., "Acid-Base Indicators," page 127, The MacMillan Co., New York, 1937.